J. E. MILLER.
SEWING MACHINE.
APPLICATION FILED MAR. 21, 1908.

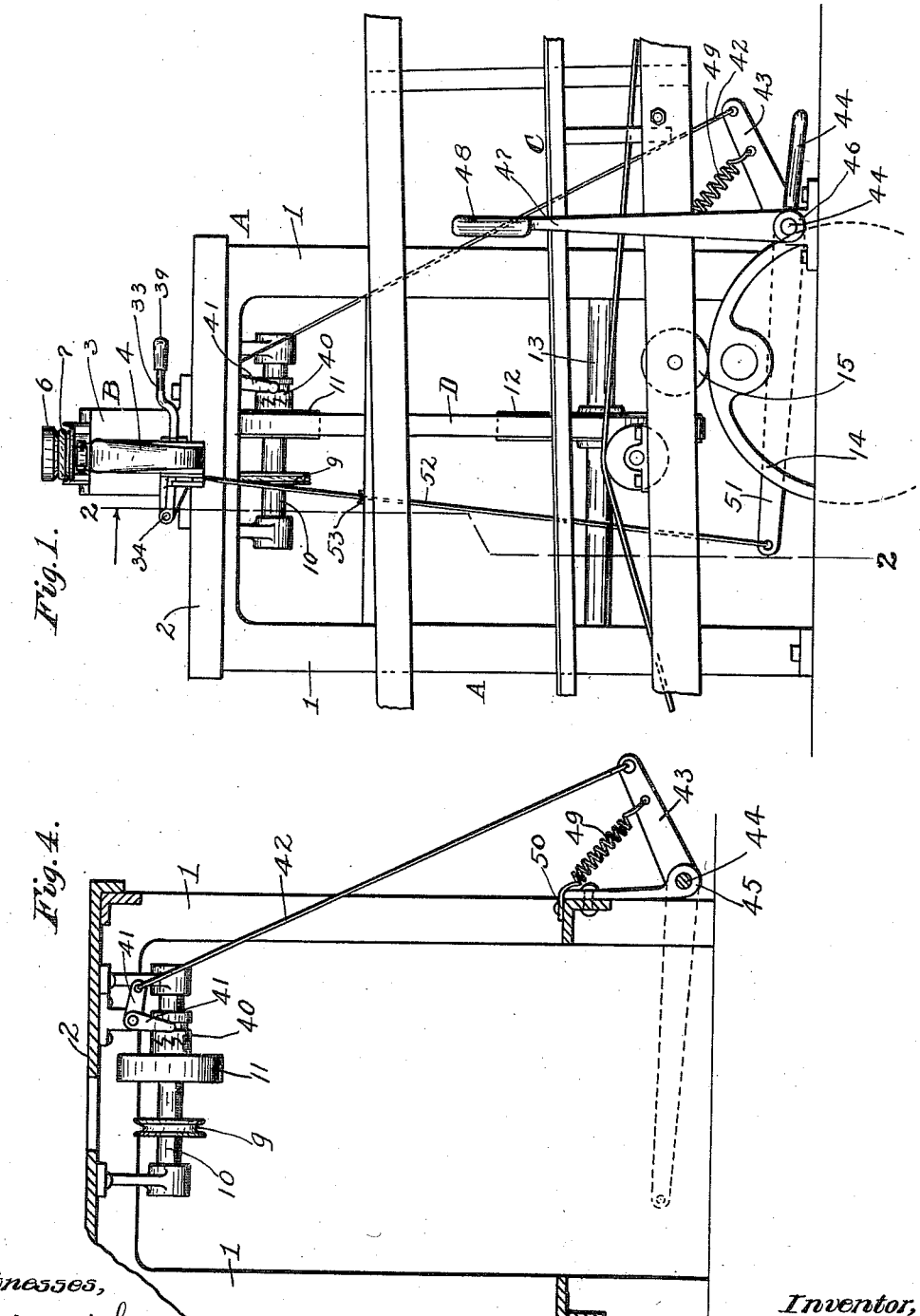

973,123.

Patented Oct. 18, 1910.

4 SHEETS—SHEET 2.

Witnesses,
William Whaley
Carrie R. Ivy

Inventor,
Jesse E. Miller
By Cyrus H. Eiler
Attorney

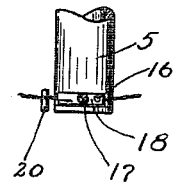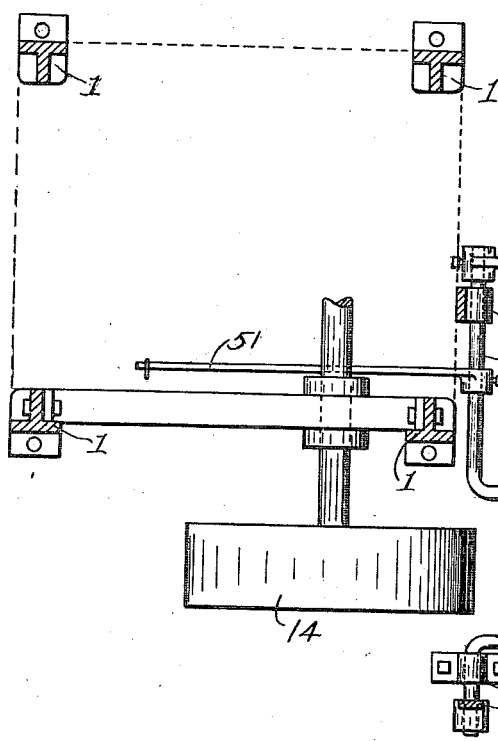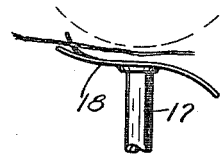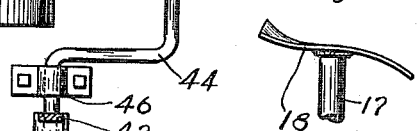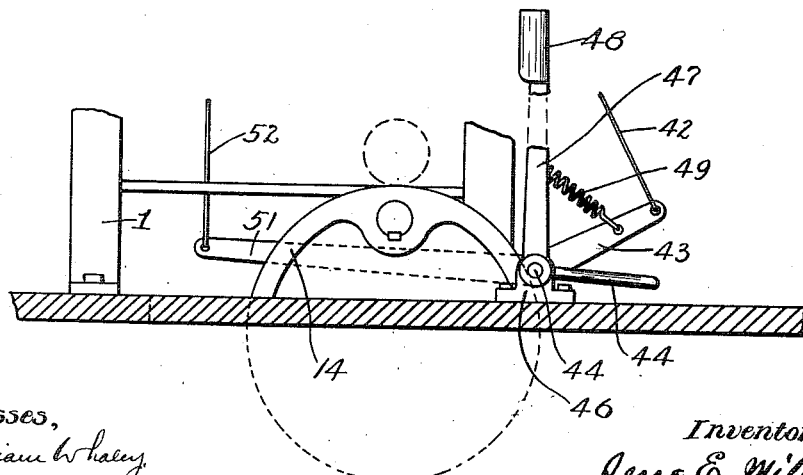

J. E. MILLER.
SEWING MACHINE.
APPLICATION FILED MAR. 21, 1908.
973,123.
Patented Oct. 18, 1910.
4 SHEETS—SHEET 4.
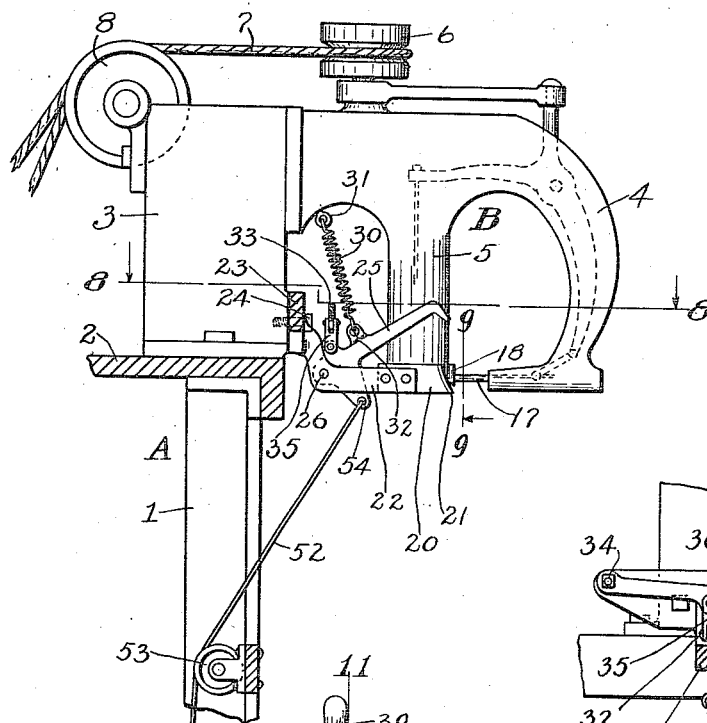
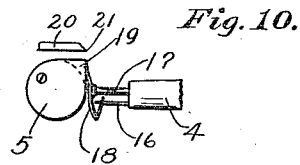
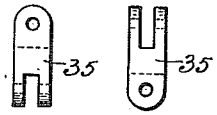
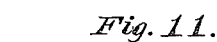
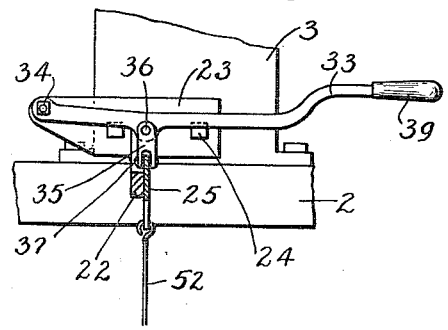
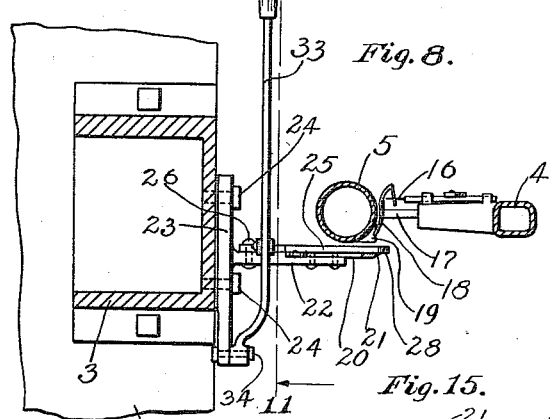
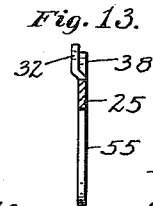
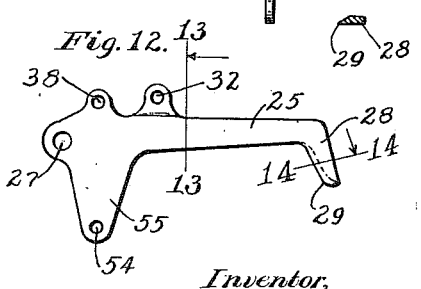
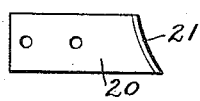
Witnesses,
William Whaley
Carrie R. Ivy
Inventor,
Jesse E. Miller
By Cyrus Kehr
Attorney.

UNITED STATES PATENT OFFICE.

JESSE E. MILLER, OF KNOXVILLE, TENNESSEE.

SEWING-MACHINE.

973,123.  Specification of Letters Patent.  Patented Oct. 18, 1910.

Application filed March 21, 1908. Serial No. 422,463.

*To all whom it may concern:*

Be it known that I, JESSE E. MILLER, a citizen of the United States, residing at Knoxville, in the county of Knox and State of Tennessee, have invented a new and useful Improvement in Sewing - Machines, of which the following is a specification, reference being had to the accompanying drawing.

My improvement relates particularly to sewing machines for closing filled bags, such bags being closed by sewing across the upper end instead of tying such end. But my improvement is applicable also to sewing machines for sewing other articles which are delivered successively to the sewing mechanism, each article being sewed independently of the others and the thread requiring cutting after the completion of the sewing of one of said articles. Such sewing machines for closing filled bags usually comprise a suitable moving support upon which the bags rest and by which they are carried past the sewing mechanism. And such sewing machines are usually provided with means for stopping and starting the operation of the sewing mechanism, to the end that said sewing mechanism may operate only while a bag is passing such mechanism.

The object of the present improvement is to provide thread-cutting mechanism which is combined with the sewing mechanism in such manner as to operate automatically upon the stopping of the latter and so as to be adapted also to be operated manually whenever desired.

Figure 3:
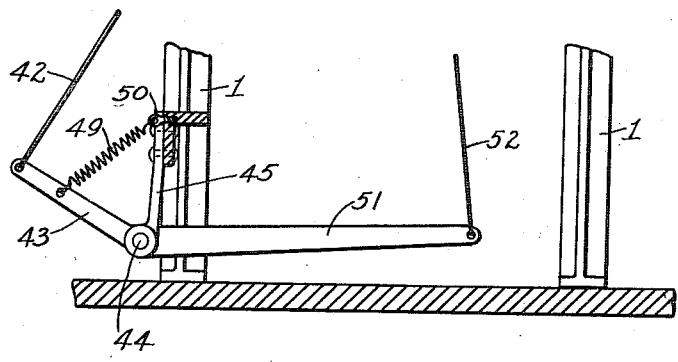
Figure 2:
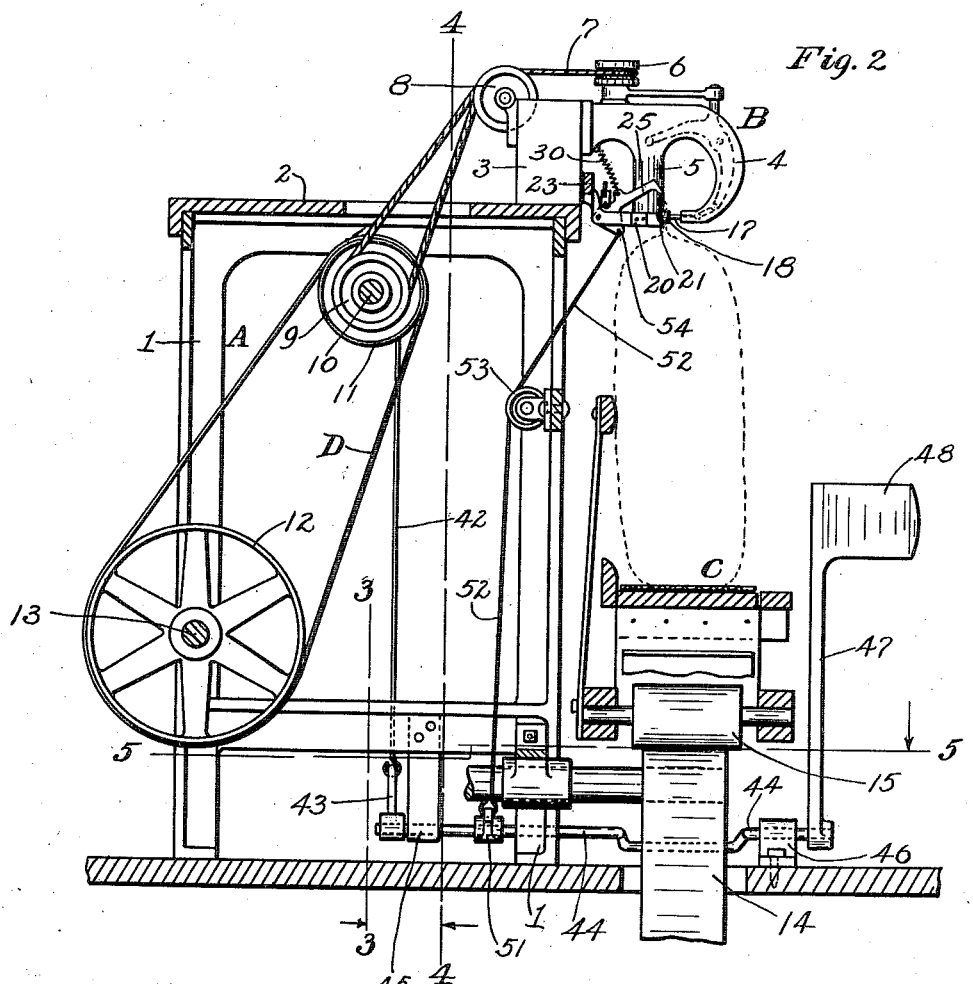

In the accompanying drawings, Figure 1 is a front elevation of a machine embodying my improvement; Fig. 2 is an upright transverse section on the line 2—2 of Fig. 1, looking in the direction of the arrow; Fig. 3 is a section on the line 3—3 of Fig. 2, looking in the direction of the arrow; Fig. 4 is a section on the line 4—4 of Fig. 2; Fig. 5 is a horizontal section on the line 5—5 of Fig. 2; Fig. 6 is a sectional elevation of the mechanism in Fig. 5; Fig. 7 is a detail elevation of the sewing machine head as seen in the upper portion of Fig. 2; Fig. 8 is a horizontal section on the line 8—8 of Fig. 7; Fig. 9 is a detail sectional view on the line 9—9 of Fig. 7, looking in the direction of the arrow; Fig. 10 is a bottom view of the mechanism adjacent the line 9—9 in Fig. 7; Fig. 11 is a section on the line 11—11 of Fig. 8, looking in the direction of the arrow; Fig. 12 is a side elevation of the movable cutting member; Fig. 13 is a section on the line 13—13 of Fig. 12, looking in the direction of the arrow; Fig. 14 is a section on the line 14—14 of Fig. 12, looking in the direction of the arrow; Fig. 15 is a plan of the stationary cutting member; Fig. 16 is a side elevation of the same cutting member; Fig. 17 is a front view of a link joining the movable cutting member to a hand lever; Fig. 18 is a side view of the same link; Fig. 19 is a detail plan of the presser foot; Fig. 20 is a detail of another form of the presser foot.

Referring to said drawings, A designates the frame supporting the sewing head, B.
C represents a support or conveyer for the bags or other articles to be sewed. The frame, A, has four upright standards, 1; a horizontal table portion, 2; a head standard, 3, mounted upon the front portion of the table, 2, and supporting the head, B, having the depending outer arm, 4, and inner arm, 5, which correspond, respectively, to the ordinary upper arm and lower arm or base plate of ordinary forms of sewing machines.

For the driving of the sewing mechanism the usual band wheel, 6, receives a band, 7, extending around said wheel and around two guide wheels, 8, on the head standard, 3, and thence around a grooved wheel, 9, on the horizontal shaft, 10, under the table, 2. Said shaft, 10, is driven by a belt, D, going around a band wheel, 11, on the shaft, 10, from a band wheel, 12, on the horizontal power shaft, 13, mounted in suitable bearings (not shown) in the rear frame standards, 1, 1. Power is transmitted to said power shaft, 13, by any desired means (not shown).

The conveyer, C, is parallel to the front of the frame, A, and directly beneath the sewing head, B, and said conveyer may be raised and lowered by means of a cam, 14, bearing against a horizontal roller, 15, mounted in the frame of the conveyer. Said cam is actuated by mechanism made the subject-matter of United States Patent, No. 918,184, granted to me April 13, 1909.

Inasmuch as the mechanism for carrying the thread and making the stitches is not of my invention and may be of any desired form, I deem it unnecessary to illustrate and describe the same.

Adjacent the needle, 16, is a horizontal presser foot shaft, 17, bearing a presser foot, 18, which presses toward the inner arm, 5, of the head, B, (see Figs. 2, 7, 8, and 10). The fabric to be sewed passes between said presser foot and said arm, in the direction indicated by the arrow in Fig. 8. Said arm is given a forward extension, 19, to afford a greater bearing for the fabric. The lower forward corner of the presser foot is curved horizontally toward the arm, 5, as shown in Figs. 19 and 20. In Fig. 19, said curved portion is slitted away from the portion above. Such curved portion serves to support the thread in front of the cutting edge, 21, of the stationary cutting member, 20, and retain the thread in position when the movable cutting member descends. Said stationary cutting member is located adjacent the forward face of the arm, 5, transversely of the plane traversed by the fabric, the cutting edge, 21, being adjacent the plane of the fabric and the path of the thread. Said cutting member is suitably secured to a bracket, 22, which is integral with a plate, 23, applied flatwise to the head standard, 3, and secured thereto by means of screw-bolts, 24, extending through said plate into said standard (Figs. 7, 8, and 11). And to said bracket is hinged the movable cutting member, 25, by means of a bolt or rivet, 26, extending through an aperture, 27, in said cutting member (Figs. 12, 7, and 8). The free end of said cutting member, 25, is turned downward to form a finger, 28, having a cutting edge, 29, directed toward the hinge of said cutting member, 25, and in proper position to engage the cutting edge, 21, of the stationary cutting member, 20, when the free end of said member, 25, is lowered by turning said member upon the hinge formed by means of the bolt or rivet, 26. For the normal holding of the free end of the cutting member, 25, in the elevated position—out of the path of the thread—one end of a contracting coiled spring, 30, is secured to the head, B, at 31, while the other end of said spring is attached to said member, 25, in an apertured ear, 32. For the manual depressing of said cutting member, 25, a hand lever, 33, is hinged by one end to the forward end of the plate 23, by means of a bolt or shaft, 34, while between its ends said hand lever is coupled to said cutting member, 25, by means of a connecting link, 35, the upper end of said link being joined to said lever by means of a bolt or rivet, 36, while the lower end of said link is coupled to said cutting member by means of a bolt or rivet, 37, extending through an apertured ear, 38, in the member, 25. From an inspection of the drawing it will be readily understood that downward pressure upon the hand piece, 39, will cause downward movement of the cutting member, 25, in opposition to the lifting action of the spring, 30. The cutting mechanism is also combined with mechanism for controlling the sewing mechanism in such manner as to operate the cutting mechanism when said controlling mechanism is actuated for stopping the sewing mechanism. In other words, the cutting mechanism automatically closes when the operation of the sewing mechanism ceases.

The band wheel, 11, is loose on the shaft, 10, and adjacent thereto is a clutch, 40, located on said shaft and controlled by a lever, 41. From said lever a connecting member or link, 42, extends downward to an arm, 43, on a rock shaft, 44, mounted in bearings, 45 and 46, said rock shaft extending transversely beneath the conveyer and having at its front end an upright arm, 47, the upper end of which bears a horizontal portion or head, 48, which is in proper position to be engaged by the operator. A contracting coiled spring, 49, may be coupled by one end to the arm, 43, and by the other end to the frame of the machine at 50. Said spring tends to raise said arm, 43, and turn the rock shaft, 44, so as to bring the arm, 47, toward the operator. Lateral movement by the operator so as to bear against the arm, 47, will turn the rock shaft in the opposite direction and cause the arm, 43, to draw the link, 42, downward and turn the clutch lever, 41, so as to engage the clutch, 40, and start the action of the sewing head. On said rock shaft, 44, at the side of the latter opposite the arm, 43, is a horizontal arm, 51. To the free end of said arm is secured a cord, 52, which extends upward over a stationary guide roller, 53, on the front portion of the frame of the machine, and thence upward to an aperture, 54, in a downward extension, 55, on the movable cutting member, 25. When the rock shaft, 44, is turned so as to depress the free end of said arm, 51, said cord, 52, and the cutting member, 25, are drawn downward, and the cutting edge of said cutting member passes over the cutting edge of the stationary cutting member, 20, whereby the threads then in position in front of the stationary cutting member are severed.

It will be observed that the rock shaft, 44, is turned by the contraction of the spring, 49, for the downward movement of the arm, 51; and, since the downward movement of said arm involves the stretching of the spring, 30, the spring, 49, must be so strong as to overcome the spring, 30, and the friction and inertia concerned in the movements of the parts and the resistance offered to the movable cutting member by the thread.

I claim as my invention:

1. In a machine of the nature described, the combination with a sewing head comprising a horizontal needle bar and a horizontal presser foot bar, of a presser foot supported by said presser foot bar and having a lower laterally-directed portion for supporting and guiding the thread, thread-cutting mechanism supported adjacent to and independently of said presser foot, a spring for moving one of the cutting members away from the other, and a stronger spring under continuous stress for normally moving said cutting member in the opposite direction against the action of the first-mentioned spring into engagement with and there holding the other cutting member.

2. In a machine of the nature described, the combination with a sewing head comprising a horizontal needle bar and a horizontal presser foot bar, of a presser foot horizontally slitted at one end and having the portion below the slit extended laterally to form a support and guide for the thread, thread-cutting mechanism supported adjacent to and independently of said presser foot, a spring for moving one of the cutting members away from the other, and a stronger spring under continuous stress for normally moving said cutting member in the opposite direction against the action of the first-mentioned spring into engagement with and there holding the other cutting member.

3. In a machine of the nature described, the combination with a sewing head comprising a horizontal needle bar and a horizontal presser foot bar, of a presser foot supported by said presser foot bar and having a lower laterally-directed portion for supporting and guiding the thread, thread-cutting mechanism supported adjacent to and independently of said presser foot, automatic means for separating the cutting members of said thread-cutting mechanism, a hand lever in operative relation with said cutting members for bringing them together, clutch mechanism for transmitting power to the sewing head, and automatic means for moving said clutch mechanism out of action and moving said cutting members into engagement with each other.

4. In a machine of the nature described, the combination with a sewing head comprising a horizontal needle bar and a horizontal presser foot bar, of a presser foot horizontally slitted at one end and having the portion below the slit extended laterally to form a support and guide for the thread, thread-cutting mechanism supported adjacent to and independently of said presser foot, automatic means for separating the cutting members of said thread-cutting mechanism, a hand lever in operative relation with said cutting members for bringing them together, clutch mechanism for transmitting power to the sewing head, and automatic means for moving said clutch mechanism out of action and moving said cutting members into engagement with each other.

5. In a machine of the nature described, a sewing head, thread-cutting members, a spring for putting said cutting members out of action, and a stronger spring connected with said cutting members so as to by said spring's power move the cutting members into engagement with each other and so hold them, and mechanism combined with said stronger spring and controlled by the operator for overcoming the action of said stronger spring.

6. In a machine of the nature described, a sewing head, thread-cutting mechanism comprising two cutting members, a spring for separating the cutting members of said thread-cutting mechanism, a hand lever in operative relation with said cutting members for bringing them together, clutch mechanism for transmitting power to the sewing head, and a stronger spring for moving said clutch mechanism out of action and moving said cutting members into engagement with each other and so holding them.

7. In a machine of the nature described, a sewing head, thread-cutting mechanism comprising two cutting members, automatic means for separating the cutting members of said thread-cutting mechanism, a hand lever in operative relation with said cutting members for bringing them together, clutch mechanism for transmitting power to the sewing head, a rock-shaft in operative relation with said clutch mechanism, and automatic means for turning said rock-shaft to put said clutch mechanism out of action and for moving said cutting members into engagement with each other.

8. In a machine of the nature described, a sewing head, thread-cutting mechanism comprising two cutting members, a spring for separating the cutting members of said thread-cutting mechanism, clutch mechanism for transmitting power to the sewing head, a spring, stronger than said first-mentioned spring, in operative relation with said clutch mechanism for putting the latter out of action and connected with one of said cutting members for by said spring's power moving said cutting member into engagement with the other cutting member in opposition to the first-mentioned spring.

9. In a machine of the nature described, a sewing head, thread-cutting mechanism comprising two cutting members, a spring for separating the cutting members of said thread-cutting mechanism, clutch mechanism for transmitting power to the sewing head, a rock-shaft in operative relation with said clutch mechanism, a spring, stronger than the first-mentioned spring, in operative relation with said rock-shaft and one of the cutting members of said thread-cutting mechanism for simultaneously moving said cutting member into engagement with the other cutting member, against the action of said first-mentioned spring, and turning said rock-shaft for putting said clutch mechanism out of action.

10. In a machine of the nature described, a sewing head, thread-cutting mechanism, driving mechanism for said sewing head, automatic mechanism in operative relation with said driving mechanism and said cutting mechanism for simultaneously putting said driving mechanism out of action and said cutting mechanism into action, and a hand lever distinct from said automatic mechanism and in operative relation with said thread-cutting mechanism for manually putting the latter into action.

11. In a machine of the nature described, a sewing head, thread-cutting mechanism, driving mechanism for said sewing head, automatic mechanism in operative relation with said driving mechanism and said cutting mechanism for simultaneously putting said driving mechanism out of action and said cutting mechanism into action, a hand lever distinct from said automatic mechanism and in operative relation with said thread-cutting mechanism for manually putting the latter into action, and automatic means for putting and yieldingly holding said cutting mechanism out of action.

In testimony whereof I have signed my name, in presence of two witnesses, this 18th day of March, in the year one thousand nine hundred and eight.

JESSE E. MILLER.

Witnesses:
 CYRUS KEHR,
 H. R. GOFORTH.